United States Patent
Jee et al.

(10) Patent No.: US 8,391,209 B2
(45) Date of Patent: Mar. 5, 2013

(54) FAST HANDOVER METHOD AND SYSTEM USING NETWORK-BASED LOCALIZED MOBILITY MANAGEMENT

(75) Inventors: Jung-Hoon Jee, Daejeon (KR); Hong-Seok Jeon, Daejeon (KR); Eun-Ah Kim, Daejeon (KR); Chang-Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 662 days.

(21) Appl. No.: 12/518,267

(22) PCT Filed: Dec. 7, 2007

(86) PCT No.: PCT/KR2007/006383
§ 371 (c)(1), (2), (4) Date: Jun. 8, 2009

(87) PCT Pub. No.: WO2008/069630
PCT Pub. Date: Jun. 12, 2008

(65) Prior Publication Data
US 2010/0027508 A1  Feb. 4, 2010

(30) Foreign Application Priority Data

Dec. 8, 2006  (KR) .................. 10-2006-0124518

(51) Int. Cl.
*H04W 4/00* (2009.01)
(52) U.S. Cl. ........................ 370/328; 370/380
(58) Field of Classification Search .................. 370/328, 370/380
See application file for complete search history.

(56) References Cited

U.S. PATENT DOCUMENTS

2003/0012179 A1* 1/2003 Yano et al. ............ 370/352
2004/0136348 A1* 7/2004 Han ....................... 370/338
(Continued)

FOREIGN PATENT DOCUMENTS

EP          1 677 466 A1       7/2006
JP       10-2006-0110151       10/2006
(Continued)

OTHER PUBLICATIONS

N. A. Fikouras, et al., "Performance of TCP and UDP during Mobile IP Handoffs in Single-Agent Subnetworks," Wireless Communications and Networking Conference, 1999; vol. 3, pp. 1258-1262.
(Continued)

*Primary Examiner* — Sai-Ming Chan
(74) *Attorney, Agent, or Firm* — Staas & Halsey LLP

(57) ABSTRACT

The present invention relates to a method in which a mobile node having mobility performs handover in a mobile communication system, and more particularly, to a fast handover method and system using network-based localized mobility management. According to an exemplary embodiment of the present invention, in a network access process between a mobile node and a base station, the base station sends a message allowing network access to the mobile node and a link-up message to an access router. Then, the access router sends a location registration message, which includes a mobile node identifier, a target base station identifier, a localized mobility anchor identifier, and access permission flag information, to a localized mobility anchor (LMA), and receives an acknowledgement (Ack) message including network prefix information. Accordingly, when a router advertisement (RA) message is sent to the base station, the mobile node performs duplicate address detection (DAD). Accordingly, fast handover is performed to reduce packet loss and delay that occur when the mobile node moves between networks, thereby minimizing the packet loss and delay.

19 Claims, 4 Drawing Sheets

U.S. PATENT DOCUMENTS

| | | | |
|---|---|---|---|
| 2004/0203740 A1 | 10/2004 | Won et al. | |
| 2007/0268919 A1* | 11/2007 | Sarikaya et al. | 370/401 |
| 2008/0037478 A1* | 2/2008 | Na et al. | 370/338 |
| 2008/0130571 A1* | 6/2008 | Maeda et al. | 370/331 |

FOREIGN PATENT DOCUMENTS

| | | |
|---|---|---|
| KR | 10-2004-0016264 | 2/2004 |
| KR | 10-2005-0023194 | 3/2005 |
| KR | 10-2006-0069144 | 6/2006 |

OTHER PUBLICATIONS

International Search Report & Written Opinion (Form PCT/ISA/210 and PCT/ISA/237) for International Application No. PCT/KR2007/006383, mailed Apr. 7, 2008.

Office Action (in Korean language) for Korean Application No. 10-2006-0124518, dated Apr. 18, 2008.

* cited by examiner

FAST HANDOVER METHOD AND SYSTEM USING NETWORK-BASED LOCALIZED MOBILITY MANAGEMENT

CROSS REFERENCE TO RELATED PATENT APPLICATIONS

This application claims the benefit under 35 U.S.C. Section 371, of PCT International Application No. PCT/KR2007/006383, filed Dec. 7, 2007, which claimed priority to Korean Application No. 10-2006-0124518, filed Dec. 8, 2006 in the Korean Intellectual Property Office, the disclosures of which are hereby incorporated by reference.

TECHNICAL FIELD

The present invention relates to a fast handover method and system using network-based localized mobility management. More particularly, the present invention relates to a fast handover method and system that reduces packet loss and delay, which occur when a mobile node moves between networks.

This work was supported by the IT R&D program of MIC/IITA [2006-P10-01, A Study on Mobility Management in Next Generation Mobile Networks].

BACKGROUND ART

In general, handover means a technology in which when a mobile node that is engaged passes a cell boundary of a corresponding base station and moves to a cell boundary of a neighboring base station, the mobile node automatically tunes with a new traffic channel of the neighboring base station and provides service, and the service is continuously maintained without being stopped even if the mobile node in a corresponding network region enters another network region at a different location.

Accordingly, in order to improve the quality of handover, packet loss needs to be maximally prevented, and the handover needs to be performed as fast as possible to minimize time in which the service is stopped.

The related art discloses handover being performed without an Internet protocol (IP) address when a mobile node moves between sub-nets, and service is continuously provided to the mobile node without performing an additional operation through a mobile Internet protocol (Mobile IPv4).

All network access devices are connected to one central router, which provides an access point with an external network. Accordingly, when the mobile node moves between the sub-nets, all new paths of packets toward the mobile node are controlled by the central router, and the mobile node is provided with service without a separate protocol even after the handover is performed. Since the mobile Internet protocol is not used, it is possible to reduce the delay that occurs due to the utilization of the Internet protocol, which continuously provides service to the mobile node.

Meanwhile, as another example of the related art relates to a method of performing handover of a portable access terminal having mobility in a portable Internet network, in which access information of the portable access terminal in a first base station access device and a first packet access router connected to each other is transmitted to a second packet access router and a second base station access device where the handover of the mobile node is performed. A tunnel is generated between the first packet access router and the second packet access router. Non-transmitted packets in the first base station access device are forwarded to the first packet access router, and are then forwarded to the second base station access device through the tunnel. The second base station access device forwards the received packets to the portable access terminal.

During the handover process, since the data transmission path is changed, data packets may be lost during the path change process. Different from a circuit-based voice service, in some cases packet loss in a packet system causes time delay due to re-transmission when a session is broken, or when a protocol such as a TCP having a re-transmission mechanism is used. As a result, service interruption time is lengthened.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a fast handover method using network-based localized mobility management, having advantages of reducing packet loss and delay when a user terminal moves between networks.

Technical Solution

An exemplary embodiment of the present invention provides a network system. The network system includes a base station that applies wireless access of a mobile node not having a separate IP (Internet protocol) for mobility, an access router that applies IP connection of the mobile node, and a localized mobility anchor (LMA) that provides network prefix information for automatically setting an address of the mobile node, and performs localized mobility management.

Another embodiment of the present invention provides a method of providing mobility to a mobile node at the time of initially connecting a network in an access router that is connected to a localized mobility anchor (LMA) performing localized mobility management. The method includes performing an initial network access process of the mobile node not having a separate IP (Internet protocol) for mobility, and requesting the LMA to register a location of the mobile node, receiving network prefix information for automatically setting an address of the mobile node from the LMA, and transmitting the network prefix information to the mobile node through an advertisement.

The request for the LMA to register the location of the mobile node may include an identifier of the mobile node, an identifier of the access router, and an identifier of the LMA.

The network prefix information may be included in an acknowledgement message for the location registration request, and includes an identifier of the mobile node, an identifier of the access router, and an identifier of the LMA.

The method may further include, after the transmitting of the network prefix information to the mobile node, receiving a request for duplicate address detection (DAD) from the mobile node whose address is generated using the network prefix information.

Yet another embodiment of the present invention provides a handover method in which a first access router provides mobility to a mobile node that moves from a region of the first access router to a region of a second access router in a localized mobility anchor (LMA) performing localized mobility management. The handover method includes receiving a handover request from the mobile node that does not have a separate IP (Internet protocol) for mobility, transmitting the handover request to the second access router, and receiving a handover response message from the second access router.

The receiving of the handover response message from the second access router may include confirming the identifier of the mobile node that is included in a handover response message generated from the target base station, transmitting the confirmed result to the base station having transmitted the handover request, and deleting a transmission path with the mobile node when an access permission flag value included in the handover response message is 1, the access permission flag value being set to 1 when the base station flows the mobile node to access the network.

ADVANTAGEOUS EFFECTS

According to an embodiment of the present invention, there is a handover method in which a second access router provides mobility to a mobile node that moves from a region of a first access router to a region of the second access router in a localized mobility anchor (LMA) performing localized mobility management. The handover method includes receiving a handover request from the mobile node that does not have a separate IP (Internet protocol) for mobility, requesting a target base station of the mobile node to perform handover and receiving a handover response message, sending the handover response message to the first access router, and sending a message for a location registration of the mobile node to the LMA, receiving network prefix information for automatically setting an address of the mobile node from the LMA, and transmitting the network prefix information through an advertisement message to the mobile node when access of the mobile node is confirmed.

In the sending of the handover response message to the first access router and the sending of the message for the location registration of the mobile node to the LMA, when the mobile node moves between IP sub-networks, the mobile node may send a handover indicating message informing handover, such that the LMA preprocesses the location registration of the moved mobile node.

The receiving of the network prefix information for automatically setting the address of the mobile node from the LMA may include setting a transmission path with the mobile node after confirming the handover response message, and buffering packets to be forwarded to the mobile node, when the packets have arrived. The buffered packets may be forwarded to the mobile node when access of the mobile node is confirmed.

BEST MODE FOR CARRYING OUT THE INVENTION

Figure 1:
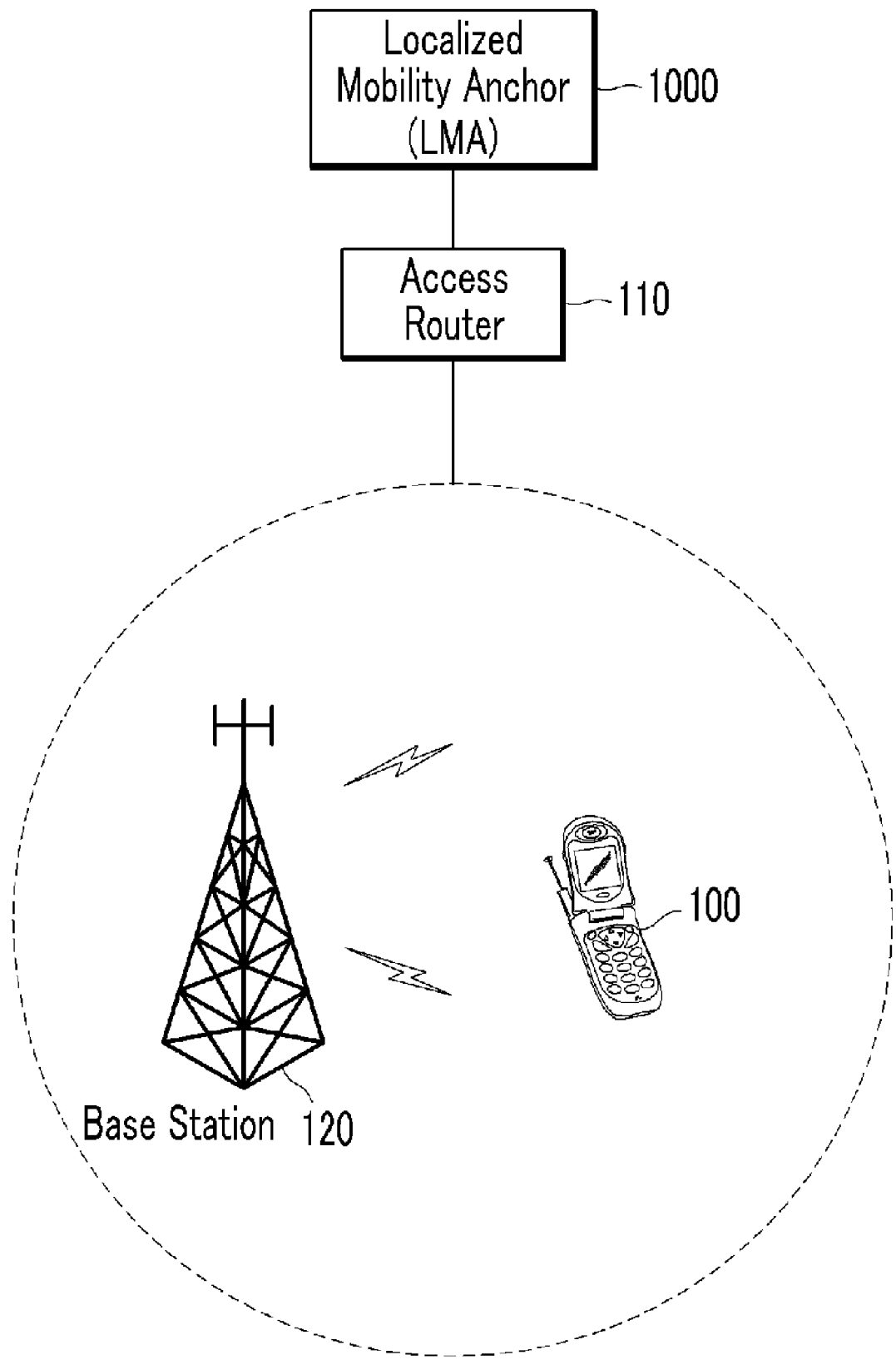
FIG. 1 is a schematic diagram illustrating a handover system using network-based localized mobility management according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A fast handover method and system using network-based localized mobility management according to an exemplary embodiment of the present invention will be described in detail with reference to the accompanying drawings.

FIG. 1 is a schematic diagram illustrating a handover system using network-based localized mobility management according to an exemplary embodiment of the present invention.

Referring to FIG. 1, a network-based localized mobility management system (hereinafter simply referred to as "system") includes a mobile node (MN) 100 that is used by a user for an application service, a base station (BS) 120 that applies wireless access of the mobile node, an access router (AR) 110 that applies IP connection of the mobile node, and a localized mobility anchor (LMA) 1000 that performs mobility management of the mobile node. In the system that has the network structure, signal transmitting/receiving between the base station 120 and the mobile node 100 is made by using an OFDM/OFDMA scheme.

Figure 2:
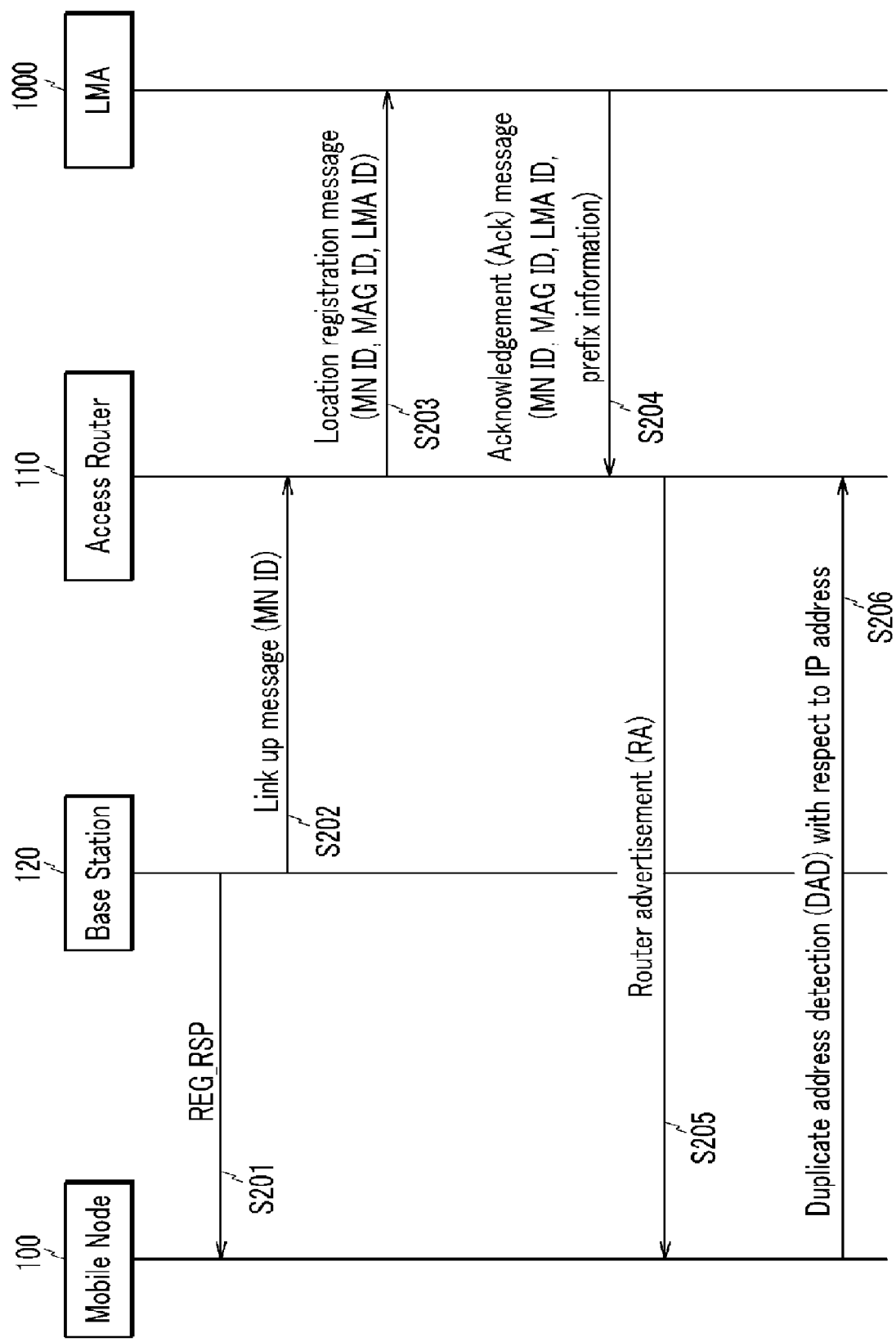
FIG. 2 is a flowchart illustrating a method of providing mobility to a mobile node at the time of initially accessing a network according to an exemplary embodiment of the present invention.

FIG. 2 is a flowchart illustrating a method of providing mobility to a mobile node at the time of initially accessing a network according to an exemplary embodiment of the present invention.

In FIG. 2, the method of providing mobility to the mobile node 100 at the time of initially accessing the network will be described with reference to the structure shown in FIG. 1.

Through a network access (network entry) process between the mobile node 100 and the base station 120, the base station 120 sends a REG_RSP message, which allows the mobile node 100 to access the network, to the mobile node 100 (step S201). In this case, the network access process is a process in which the mobile node 100 enters the network providing service within coverage of the network through initial access defined in a wireless communication system.

Further, the base station 120 sends a link-up message including a mobile node identifier (MN ID) to the access router 110 (step 3202). Then, the access router 110 sends a location registration message, which includes a mobile node identifier (MN ID), an access router identifier (AR ID), and an LMA identifier (LMA ID), to the LMA 1000 (step S203). In this case, the LMA 1000 manages mobility of the mobile node 100. In response to the location registration message that is received from the access router 110, the LMA 1000 sends an acknowledgement (Ack) message including network prefix information for the mobile node 100 to the access router 110 (step S204). Then, the access router 110 sends a router advertisement (RA) message using the network prefix information that is transmitted to the mobile node 100 (step S205). Accordingly, after receiving the router advertisement (RA) message, the mobile node 100 automatically sets an IP address and performs duplicate address detection (DAD) to verify uniqueness of the set IP address (step S206).

Figure 3:
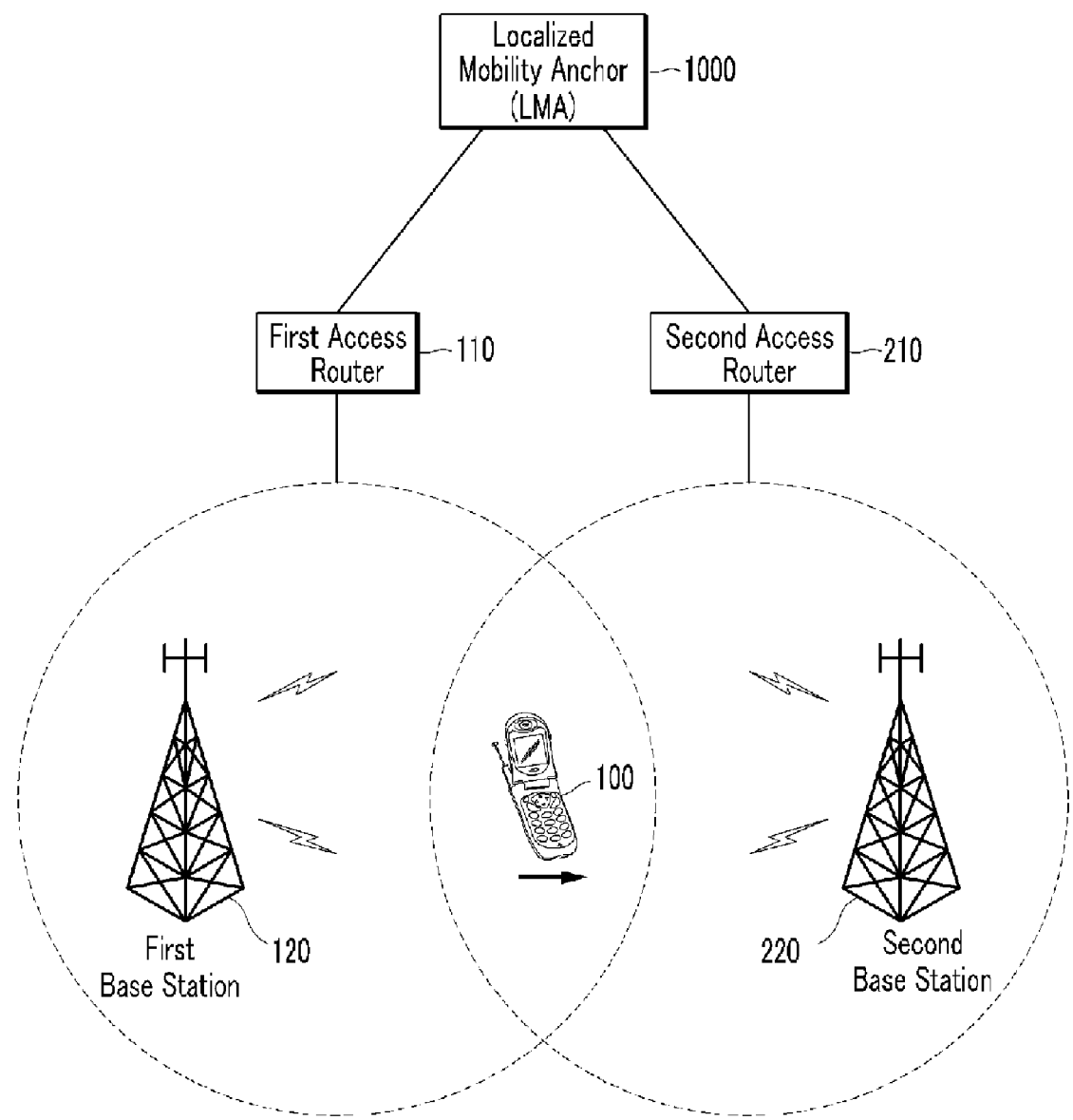
FIG. 3 is a schematic diagram illustrating a handover system using localized mobility management when a mobile node moves between networks according to an exemplary embodiment of the present invention.

FIG. 3 is a schematic diagram illustrating a handover system using localized mobility management when a mobile node moves between networks according to an exemplary embodiment of the present invention.

In FIG. 3, a network-based localized mobility management system is shown. In this case, in addition to the structure shown in FIG. 1, a neighboring base station is shown. Accordingly, FIG. 3 shows handover when the mobile node 100 moves from a first base station 120 to a second base station 220. The network structure shown in FIG. 3 includes a mobile node (MN) 100 that is used by a user for an application service, first and second base stations (BS) 120 and 220 that apply wireless access of the mobile node, first and second access routers (AR) 110 and 210 that apply IP connection of the mobile node, and an LMA 1000 that manages mobility of the mobile node. In the system that has the above-described network structure, when the mobile node 100 is within an overlapping cell boundary between the first base station 120 and the second base station 220, that is, a handover region, it is necessary to apply handover to the mobile node 100 to have mobility of the mobile node 100.

In FIG. 3, for convenience of explanation, two base stations are shown. However, two or more access routers, base stations, and mobile nodes may be included in the structure shown in FIG. 3. In the wireless communication system, the mobile node 100 that is located in the handover region receives pilot channels that are transmitted from a plurality of base stations. In addition, the mobile node 100 measures the signal intensity of the received pilot channels, and selects the base station that transmits a pilot channel having the highest signal intensity. That is, the mobile node 100 selects the base station that has the best reception state among the plurality of base stations transmitting the pilot channels as a target base station, and recognizes the base station to cover the mobile node 100.

Figure 4:
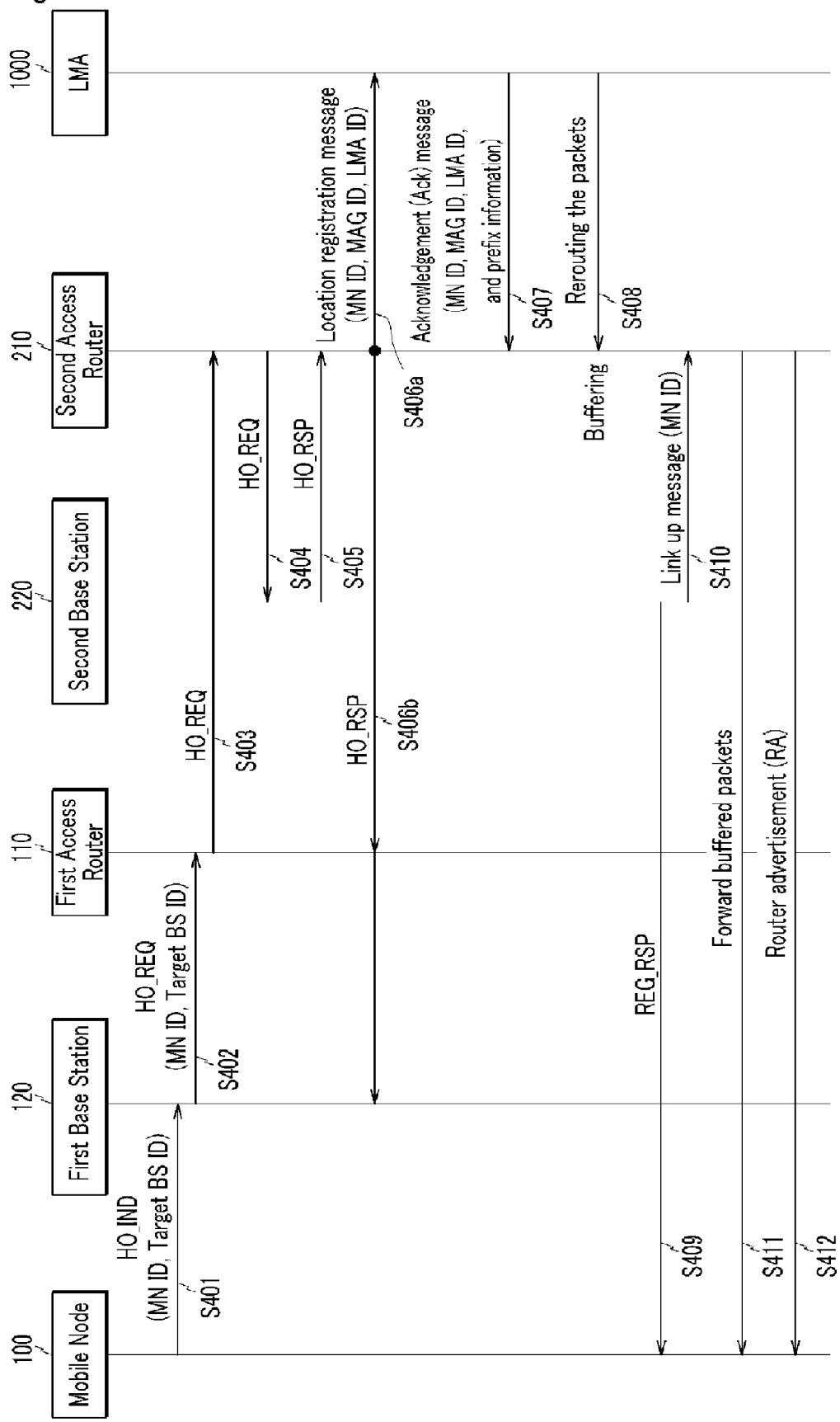
FIG. 4 is a flowchart illustrating a fast handover method using localized mobility management when a mobile node moves between networks according to an exemplary embodiment of the present invention.

FIG. 4 is a flowchart illustrating a fast handover method using localized mobility management when a mobile node moves between networks according to an exemplary embodiment of the present invention.

In FIG. 4, a method of providing mobility to the mobile node 100 when the mobile node 100 moves between the networks will be described with reference to the structure shown in FIG. 3.

As described above with reference to FIG. 3, after determining the target base station, the mobile node 100 sends a handover indicating information (MOB_HO-IND) message informing of handover, which includes a mobile node identifier (MN ID) and a target base station identifier (Target BS ID), to the first base station 120 that provides service to the mobile node 100 (step S401). Then, the first base station 120 sends a handover request (HO-REQ) message to the first access router 110. At this time, the HO-REQ message also includes the mobile node identifier (MN ID) and the target base station identifier (Target BS ID) (step S402). The first access router 110 confirms the target base station identifier (Target BS ID) from the received HO-REQ message, and sends the HO-REQ message to the second access router 210 that corresponds to the target base station (Target BS), that is, the second base station 220 (step S403). Accordingly, the second access router 210 sends the HO-REQ message to the second base station 220 that corresponds to the target base station identifier (step S404).

Then, when the second base station 220 that receives the HO-REQ message allows the mobile node 100 to access the network, the second base station 220 sets an access permission flag value to 1, and sends the handover response (HO-RSP) message to the second access router 210 (step S405). At this time, the HO-RSP message includes a mobile node identifier (MN ID). The second access router 210 confirms the access permission flag value that is included in the HO-RSP message, which is received from the second base station 220. Then, when it is confirmed that the corresponding access permission flag value is set to 1, the second access router 210 sends a location registration message, which includes an MN ID, a MAG ID, and an LMA ID, to the LMA 1000 (step S406a). Further, the LMA 1000 sends the HO-RSP message through the first access router 110 to the first base station 120 (step S406b).

Then, after completing the location registration process, the LMA 1000 updates its routing table, and changes a transmission path of packets toward the mobile node 100 from the first access router 110 to the second access router 210. In addition, the LMA 1000 extracts network prefix information from a D1 thereof on the basis of the mobile node identified. That is, when the mobile node moves in the corresponding network region, that is, as shown in FIG. 3, the mobile node moves from the first access router side to the second access router side, and the LMA 1000 extracts the network prefix information that has been allocated to the mobile node. Then, the LMA 1000 sends an acknowledgement (Ack) message, which includes the extracted network prefix information for the mobile node 100, to the second access router 210 (step S407). Accordingly, the second access router 210 receives the acknowledgement message, updates its routing table, and buffers packets when the packets to be forwarded to the mobile node 100 have arrived (step S408).

Meanwhile, when the mobile node 100 moves to the second base station 220, the second base station 220 confirms the mobile node 100, and sends the REG_RSP message to allow the mobile node 100 to access the network (step S409). At this time, the second base station 220 sends an LU (link-up) message, which includes a mobile node identifier, to the second access router 210 (step S410). After receiving the LU (link-up) message, the second access router 210 forwards the packets, which are buffered by the second access router 210 in step S408, to the mobile node 100 (step S411). Further, by using the network prefix information that is included in the acknowledgement message for the location movement registration received from the LMA 1000, the second access router 210 sends a router advertisement (RA) message to the mobile node 100 (step S412). Accordingly, the mobile node 100 receives the router advertisement (RA) message. At this time, like the case of FIG. 3, when the mobile node 100 moves from the first access router side to the second access router side in the same LMA coverage, the network prefix information that is included in the received router advertisement message is the same as the information that has been received in the first access router. Thus, the mobile node 100 does not perform the duplicate address detection.

Accordingly, in a state where the mobile node 100 does not have a separate IP protocol for mobility, mobility of the mobile node 100 between IP sub-networks is provided. A fast handover process is performed to reduce packet loss and delay occurring when the packets move, thereby minimizing the packet loss and delay.

The above-described system is only one example of the exemplary embodiment of the present invention, and the exemplary embodiment of the present invention may be applied to another communication system.

The exemplary embodiment of the present invention that has been described above may be implemented by not only an apparatus and a method but also a program capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, mobility of the mobile node between networks can be provided without installing separate software for mobility in the mobile node. The fast handover is performed using localized mobility management when the mobile node moves, thereby minimizing packet loss and delay.

The invention claimed is:

1. A network system comprising:
   a base station that applies wireless access of a mobile node not having a separate IP (Internet protocol) for mobility by sending the mobile node a REG_RSP (registered response) message that allows the mobile node to access the network as an initial communication between the base station and the mobile node;
   an access router that applies IP connection of the mobile node; and
   a localized mobility anchor (LMA) that provides network prefix information for automatically setting an address of the mobile node, and performs localized mobility management,
   wherein, at initial access by the mobile node, the access router sends a message for a location registration of the mobile node, and after confirming an acknowledgement message for the location registration message, buffers packets to be forwarded to the mobile node and forwards the packets to the mobile node.

2. The network system of claim 1, wherein the base station allows the mobile node to access a network, and sends a message that informs when the mobile node accesses the network to the access router.

3. The network system of claim 1, wherein the mobile node sends a message for handover indicating information when the mobile node moves between sub-networks to the LMA, and automatically sets the address using the network prefix information.

4. The network system of claim 1, wherein the LMA sends an acknowledgement message including the network prefix information for the mobile node with respect to a message for a location registration of the mobile node, and stores a packet path in the corresponding access router.

5. The network system of claim 4, wherein the LMA extracts the network prefix information from its DB on the basis of an identifier of the mobile node, extracts the network prefix information having been allocated to the mobile node when the mobile node moves in a network region, and transmits the network prefix information.

6. A method of providing mobility to a mobile node at the time of initially connecting a network in an access router that is connected to a localized mobility anchor (LMA) performing localized mobility management, the method comprising:
   performing an initial network access process of the mobile node not having a separate IP (Internet protocol) for mobility by sending the mobile node a REQ_RSP (registration response) message that allows the mobile node to access the network as an initial communication between the base station and the mobile node, and requesting the LMA to register a location of the mobile node;
   receiving network prefix information for automatically setting an address of the mobile node from the LMA; and
   transmitting the network prefix information to the mobile node through an advertisement,
   wherein, at initial access by the mobile node, the access router sends a message for a location registration of the mobile node, and after confirming an acknowledgement message for the location registration message, buffers packets to be forwarded to the mobile node and forwards the packets to the mobile node.

7. The method of claim 6, wherein the performing of the initial network access process of the mobile node and the request for the LMA to register the location of the mobile node are received when allowing the mobile node to access the network at the time of the network initial access of the mobile node, and includes an identifier of the mobile node.

8. The method of claim 6, wherein the request for the LMA to register the location of the mobile node includes an identifier of the mobile node, an identifier of the access router, and an identifier of the LMA.

9. The method of claim 6, wherein the network prefix information is included in an acknowledgement message for the location registration request, and includes an identifier of the mobile node, an identifier of the access router, and an identifier of the LMA.

10. The method of claim 6, further comprising, after the transmitting of the network prefix information to the mobile node,
    receiving a request for duplicate address detection (DAD) from the mobile node whose address is generated using the network prefix information.

11. A handover method in which a first access router provides mobility to a mobile node that moves from a region of the first access router to a region of a second access router in a localized mobility anchor (LMA) performing localized mobility management, the handover method comprising:
    performing an initial network access process of the mobile node not having a separate IP (Internet protocol) for mobility by sending the mobile node a REQ_RSP (registration response) message that allows the mobile node to access the network as an initial communication between the base station and the mobile node, and requesting the LMA to register a location of the mobile node;
    receiving a handover request from the mobile node that does not have a separate IP (Internet protocol) for mobility;
    transmitting the handover request to the second access router; and
    receiving a handover response message from the second access router,
    wherein, at initial access by the mobile node, the access router sends a message for a location registration of the mobile node, and after confirming an acknowledgement message for the location registration message, buffers packets to be forwarded to the mobile node and forwards the packets to the mobile node.

12. The handover method of claim 11, wherein the handover request includes an identifier of the mobile node and an identifier of a target base station that provides services in the region of the second access router.

13. The handover method of claim 12, wherein the transmitting of the handover request to the second access router is requesting the second access router corresponding to the identifier of the target base station of the mobile node to perform handover.

14. The handover method of claim 12, wherein the receiving of the handover response message from the second access router includes confirming the identifier of the mobile node that is included in a handover response message generated from the target base station, transmitting the confirmed result to the base station having transmitted the handover request, and deleting a transmission path with the mobile node when an access permission flag value included in the handover response message is 1, the access permission flag value being set to 1 when the base station allows the mobile node to access the network.

15. A handover method in which a second access router provides mobility to a mobile node that moves from a region of a first access router to a region of the second access router in a localized mobility anchor (LMA) performing localized mobility management, the handover method comprising:

performing an initial network access process of the mobile node not having a separate IP (Internet protocol) for mobility by sending the mobile node a REQ_RSP (registration response) message that allows the mobile node to access the network as an initial communication between the base station and the mobile node, and requesting the LMA to register a location of the mobile node;

receiving a handover request from the mobile node that does not have a separate IP (Internet protocol) for mobility;

requesting a target base station of the mobile node to perform handover and receiving a handover response message;

sending the handover response message to the first access router, and sending a message for a location registration of the mobile node to the LMA;

receiving network prefix information for automatically setting an address of the mobile node from the LMA; and transmitting, when access of the mobile node is confirmed, the network prefix information through an advertisement message to the mobile node, wherein, at initial access by the mobile node, the access router sends a message for a location registration of the mobile node, and after confirming an acknowledgement message for the location registration message, buffers packets to be forwarded to the mobile node and forwards the packets to the mobile node.

16. The handover method of claim 15, wherein the requesting the target base station of the mobile node to perform handover and the receiving of the handover response message include:

confirming an access permission flag value that is included in the handover response message, the access permission flag value being set to 1 when the base station allows the mobile node to access a network;

generating the message for the location registration when the access permission flag value is 1; and confirming an identifier of the mobile node that is included in the handover response message and sending the handover response message to the first access router.

17. The handover method of claim 15, wherein, in the sending of the handover response message to the first access router and the sending of the message for the location registration of the mobile node to the LMA, when the mobile node moves between IP sub-networks, the mobile node sends a handover indicating message informing handover such that the LMA preprocesses the location registration of the moved mobile node.

18. The handover method of claim 15, wherein the receiving of the network prefix information for automatically setting the address of the mobile node from the LMA includes:

setting a transmission path with the mobile node after confirming the handover response message; and buffering packets to be forwarded to the mobile node when the packets have arrived.

19. The handover method of claim 15, wherein, in the transmitting of the network prefix information through the advertisement message to the mobile node, the buffered packets are forwarded to the mobile node when access of the mobile node is confirmed.

* * * * *